United States Patent [19]

Tolley

[11] 4,174,963
[45] Nov. 20, 1979

[54] RECOVERY OF TITANIUM METAL VALUES
[75] Inventor: William K. Tolley, Arlington Heights, Ill.
[73] Assignee: UOP Inc., Des Plaines, Ill.
[21] Appl. No.: 929,605
[22] Filed: Jul. 31, 1978
[51] Int. Cl.$^2$ ............... C21B 15/00; C01G 23/04
[52] U.S. Cl. ............... 75/101 R; 75/1 T; 75/114; 423/82; 423/83; 423/85; 423/86; 423/140; 423/156
[58] Field of Search ............... 423/82, 83, 85, 86; 75/1 T, 101 R, 114, 108

[56] References Cited

U.S. PATENT DOCUMENTS

| | | | |
|---|---|---|---|
| 3,076,692 | 2/1963 | Ruter et al. | 423/83 |
| 3,236,596 | 2/1966 | Zimgilil et al. | 423/83 |
| 3,457,037 | 7/1969 | Aramendia et al. | 423/86 |
| 3,825,419 | 7/1974 | Chim | 75/101 R |
| 3,859,077 | 1/1975 | Othmer | 75/1 T |
| 3,875,286 | 4/1975 | Robinson et al. | 423/82 |
| 3,897,537 | 7/1975 | Robinson et al. | 423/82 |
| 3,903,239 | 9/1975 | Berkovich | 75/101 R |
| 3,929,962 | 12/1975 | Shiah | 423/83 |

FOREIGN PATENT DOCUMENTS 50-51918  5/1975  Japan ............... 423/82

*Primary Examiner*—Herbert T. Carter
*Attorney, Agent, or Firm*—James R. Hoatson, Jr.; Raymond H. Nelson; William H. Page, II

[57] ABSTRACT

Titanium metal values may be recovered from titanium and iron bearing sources such as an ilmenite ore by subjecting the source to an oxidation treatment and a reductive roast after having crushed the source to a desired particle size. The reduced source is then leached by treatment with a halogen-containing compound to form soluble titanium halides and iron halides. Thereafter the soluble titanium halide is precipitated as titanium dioxide by treatment with an iron oxide such as ferric oxide and recovered. The amount of titanium dioxide which is recovered is determined by the amount of reductant utilized in the reductive roast.

5 Claims, No Drawings

RECOVERY OF TITANIUM METAL VALUES

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

Heretofore in the prior art various methods have been utilized to recover titanium values from titanium bearing sources. For example, in U.S. Pat. No. 3,235,596 an unroasted ilmenite ore is leached with hydrogen chloride at an elevated temperature. Following this, dissolved iron is reduced with iron or other reductants to precipitate ferrous chloride by saturating the liquor with hydrogen chloride gas. The hydrogen chloride is then extracted from the liquor by a vacuum distillation and the titanium is recovered by conventional means. Likewise, U.S. Pat. No. 3,825,419 reduces an ilmenite ore to produce ferrous oxides. The reduced ore is then leached for about 4 hours under a moderate pressure thereby dissolving the iron in the acid along with about 15% of the titanium. The iron is recovered as impure ferric oxide by spray roasting the solution while the insoluble leach product which is primarily titanium dioxide but which contains all of the silica present in the original ore is recovered. U.S. Pat. No. 3,859,077 also discloses a process for recovering titanium in which a titanium tetrahalide is mixed with iron oxide in slag or a titaniferous ore at an extremely high temperature of about 1000° C. to produce volatile impurity chlorides and titanium dioxide. A similar patent, U.S. Pat. No. 3,929,962, also reduces a titanium bearing ore at a high temperature to produce titanium sesquioxide which is in a form whereby it is easier to treat for a titanium-iron separation. Another prior art reference, U.S. Pat. No. 3,903,239 teaches a method for recovering titanium in which unroasted ilmenite is leached over a period of days at room temperature to recover about 80% of the titanium. Sulfur dioxide is added during the leach process to cause a precipitation of the ferrous chloride after which titanium dioxide is recovered by diluting and heating the solution. U.S. Pat. No. 3,076,692 also discusses the problem of minimizing the loss of titanium when leaching to produce titanium in a +4 valence state. The process described in this reference attempts to overcome the loss problem by utilizing a relatively short leach time, i.e., 10-20 minutes, or by adding phosphorous compounds.

In contradistinction to the prior art methods hereinbefore set forth for recovering titanium metal values from a titanium bearing source, it has now been found possible to effect a titanium value recovery from a source such as ilmenite in such a manner so that the loss of titanium is minimal in nature.

This invention relates to a process for obtaining titanium values from a source which contains iron and titanium. More specifically, the invention is concerned with a process whereby the loss of titanium during the various steps of the process is minimized, thereby assuring a more complete recovery of the desired product. By utilizing the process of the present invention, it is possible to allow virtually complete dissolution of ilmenite ores in hydrochloric acid, the dissolved metal halides being stable at relatively high temperatures for a longer period of time than was heretofore possible. For example, by utilizing the operating parameters of the leach solution it is possible, if so desired, to effect the leach at a relatively high temperature, that is, about 100° C. for a period of time which may range up to about 2 hours in duration without the attendant loss of titanium.

However, by utilizing operating parameters of the type hereinafter set forth in greater detail, it is possible to effect the leach of the treated ore in a relatively short period of time, that is, about 0.25 hours to about 0.5 hours in duration. In addition, excessively high roasting temperatures as well as relatively long periods of roast are avoided along with the attendant use of normal roasting equipment. Another advantage which may be found by utilizing the process of the present invention is that it is not necessary to submit the ore to a grinding operation whereby the particle size of the ground ore is excessively small in order to obtain a high recovery of titanium.

It is therefore an object of this invention to provide an improved process for the obtention of desired titanium metal values.

A further object of this invention is to provide a hydrometallurgical process for obtaining high yields of titanium metal values in an economical manner.

In one aspect an embodiment of this invention resides in a process for the recovery of titanium metal values from a titanium and iron bearing source which comprises the steps of crushing said source, subjecting said crushed source to an oxidation treatment with an oxidizing agent at an elevated temperature, subjecting said crushed source to a reductive roast in the presence of a reductant at an elevated temperature, leaching the resultant reduced source with a leach solution comprising a halogen-containing compound separating insoluble gangue from the soluble metal halides, precipitating titanium dioxide from the soluble metal halides by treatment with iron oxides, and separating and recovering said titanium dioxide, the improvement in said process which comprises effecting said reductive roast in which said reductant is present in an amount of from about two to three times the amount which is stoichiometrically required to reduce the iron oxide present in said source to metallic iron.

A specific embodiment of this invention is found in a process for the recovery of titanium metal values from a titanium and iron bearing source which comprises crushing said source, subjecting the crushed source to a reductive roast in the presence of a reductant which is present in an amount of from about two to about three times the amount which is stoichiometrically required to reduce the iron oxide present in said source to metallic iron at a temperature in the range of from about 600° to about 900° C., leaching the resultant reduced source with a leach solution comprising hydrogen chloride, separating insoluble gangue from the soluble metal chlorides, precipitating titanium dioxide from the soluble metal chlorides by treatment with iron oxides and separating and recovering said titanium dioxide.

Other objects and embodiments will be found in the following detailed description of the present invention.

As hereinbefore set forth the present invention is concerned with a process for improving the yields of titanium metal values from a titanium bearing source. In addition to improving the percentage of titanium extracted in the leach step of the operation, it is also possible to effect the leaching of the ore to form titanium in a +3 valence state such as titanium trichloride and iron in a +2 valence state such as ferrous chloride in the solution without requiring the formation of titanium in a +3 state by roasting. The obtention of high extraction of titanium is effected by utilizing certain improvements in an overall process, the improvements being obvious in the discussion of the process in greater detail.

The overall process for the recovery of titanium metal values from a titanium bearing source such as an ilmenite ore or a beach sand which contains iron as well as other metal values such as vanadium, chromium, manganese, etc., comprising crushing said source to a particle size in the range of from about 35 mesh to about 100 mesh (Tyler). The crushing of the titanium bearing source may be effected in any suitable apparatus such as a ball mill, etc. Following the crushing or grinding of the ore to the desired size, the ore is then oxidized by treatment with an oxidizing agent such as an oxygen-containing gas such as air, oxygen, etc., at an elevated temperature less than that which is required to form pseudobrookite. Generally speaking, the temperature at which the source is subjected to the oxidation treatment will be in a range of from about 700° to about 900° C. for a period of time which may range from about 0.5 up to about 2 hours.

Following this the crushed metal bearing source in which the iron which is present has been oxidized to ferric oxide is then subjected to a reductive roast at an elevated temperature whih may range from about 600° up to about 900° C. or more in the presence of a reductant. The reductant or reducing agent is gaseous in form and will comprise hydrogen, carbon monoxide, combinations of carbon monoxide and hydrogen, etc., said reducing treatment being effected for a period of time which may range from about 0.5 up to about 2 hours or more in duration. It has now been discovered that the amount of reductant which is employed in the reducing step of the operation is critical and therefore the amount to be used is based on the stoichiometric amount which is required to reduce the iron to a metallic state. In the preferred embodiment of the invention the amount of reductant employed is in a range of from about two to about three times the amount of reductant which is stoichiometrically required. By utilizing this amount of reductant, it is possible to minimize the resultant loss of titanium as insoluble products in the subsequent leach step of the operation with a concurrent optimum dissolution of the titanium content of the ore as titanium halide in said leach step. In the preferred embodiment of the invention the reducing atmosphere which is used to accomplish the purpose of the roast usually comprises a mixture of about 50% carbon monoxide and 50% hydrogen.

After reductively roasting the metal bearing source the reduced source is then subjected to an aqueous leach which, in the preferred embodiment of the invention comprises an aqueous hydrogen halide solution. The preferred hydrogen halide which is employed in the reaction comprises hydrogen chloride, although other hydrogen halides such as hydrogen bromide and hydrogen iodide may also be utilized, although not necessarily with equivalent results. The aforesaid leach of the metal bearing source is usually effected at a temperature which may range from about ambient to about 110° C., the preferred range being from about 80° to about 100° C., for a period of time ranging from about 0.25 hours up to about 1 hour or more in duration.

Following the leach of the metal bearing source which will form soluble iron halides and titanium halides such as ferrous chloride, titanium trichloride, etc., the mixture is subjected to a separation step in which the solid gangue is separated from the soluble metal chlorides and discarded. The separation of the solid gangue from the soluble metal chlorides may be effected in any suitable manner by means well known in the art, said means including decantation, filtration, etc. The soluble metal halides are then subjected to a precipitation step in a precipitation zone wherein the aqueous metal halides such as titanium trichloride and ferrous chloride are subjected to reaction with an iron oxide, preferably one in which the iron is present in its highest valence state such as ferric oxide. In this precipitation zone where the treatment is effected at temperatures ranging from about 80° to 110° C., the iron oxide such as ferric oxide will react with titanium trichloride to form solid titanium dioxide. This compound, after separation from the soluble iron halides in a solid/liquid separation zone, will be recovered as such and may thereafter be treated to recovery as titanium metal, if so desired. Following separation of the solid titanium dioxide from the soluble ferrous chloride, the latter is passed to a crystallization zone wherein the temperature is reduced to afford crystallization of the ferrous chloride. For example, the temperature at which the crystallization or precipitation of the ferrous chloride is effected may range from about 0° to slightly in excess of ambient or, in extreme cases, up to about 90° C. When utilizing subambient temperatures the cooled solution is maintained in the desired subambient by external means such as an ice bath, cooling coils, etc. After crystallization of the ferrous chloride is completed, the solids are separated from the leach liquor which may be recycled back to the leach zone. The solid ferrous chloride is recovered and a major portion of the product is subjected to a direct reduction step which is effected at an elevated temperature in the range of from about 600° to about 900° C. in contact with an excess of hydrogen. In this direct reduction step, the metallic iron which is produced will be in the form of powder or crystals and may be recovered as such. In addition, the hydrogen chloride which is formed during the direct reduction of the ferric chloride to metallic iron is withdrawn and recycled to the leach step of the process to make up a portion of the leach solution. While a major portion of the ferrous chloride in an amount ranging from 50% to 90% is subjected to this direct reduction, the remaining portion in an amount ranging from about 10% to about 50% is subjected to an oxidation step. In the oxidation step the ferrous chloride is treated at an elevated temperature ranging from about 300° to about 800° C. by contact with an oxygen-containing gas such as air or oxygen, the preferred oxidizing agent comprising air due to its greater availability and negligible cost. Any hydrogen chloride which may be formed during the oxidation step is recycled to the ferrous chloride crystallization zone to saturate said zone in order to insure a complete precipitation of the ferrous chloride by reducing the solubility of said compound. In the oxidation zone the reaction of the ferrous chloride with an oxidizing agent results in the formation of iron oxides such as ferrous oxide, ferric oxide, these compounds being charged to the zone containing the titanium trichloride where said titanium trichloride is contacted with the iron oxides to form titanium dioxide.

The process of the present invention may be effected in any suitable manner and may comprise either a batch or continuous type operation. For example, when a batch type operation is used a titanium bearing source such as ilmenite ore which has been crushed or ground to the desired particle size is subjected to an oxidation treatment. In the oxidation treatment the ore is contacted with an oxygen-containing gas such as air at an elevated temperature within the range hereinbefore set forth for a predetermined period of time. Following the oxidation treatment the ore is then subjected to a reductive roast. In the reductive roast the ore is contacted with a reducing agent such as a mixture of carbon monoxide and hydrogen also at a temperature within the range hereinbefore set forth and for a predetermined period of time. The amount of reducing agent which is utilized as the reductant will be determined within a desired range and generally will be present in the reduction zone in an amount in the range of from about two to three times the amount of reducing agent which is stoichiometrically required to reduce the iron oxides present in the ore to metallic iron. Thereafter the reduced ore is then placed in an appropriate apparatus where it is contacted with a leach solution which, in the preferred embodiment of the invention, comprises an aqueous hydrogen chloride solution. After completing the leach which may be effected at temperatures ranging from ambient up to about 110° C., the solid material comprising gangue and/or other insoluble metal compounds is separated from the leach liquor, the latter then being placed in an apparatus wherein it is contacted with iron oxides, and preferably ferric oxide, at an elevated temperature ranging from about 80° to about 110° C. After formation and precipitation of titanium dioxide by treatment with the ferric oxide, the solid titanium dioxide is separated from the leach liquor and recovered. The leach liquor is treated to precipitate ferrous chloride which may then be treated by a direct reductive step to recover metallic iron and hydrogen chloride or, in the alternative, it may be subjected to an oxidation step to produce ferric oxide which can be reused in the treatment of the soluble titanium chloride to form the desired titanium dioxide.

As an alternative method of recovering the desired product, the leach liquor which contains the soluble ferrous chloride and titanium chloride after separation from the solid gangue material may be placed in an apparatus which is maintained at a temperature lower than that at which the leach is effected. The result of this lowering of the temperature will be the formation of crystalline ferrous chloride. After crystallization of the ferrous chloride is complete, the soluble titanium chloride may be separated from the crystals by conventional means such as filtration, decantation, etc., and the solution then treated with ferric oxide in a manner similar to that hereinbefore set forth to form titanium dioxide which is then separated and recovered. The solid ferrous chloride obtained in the previous precipitation step may then be subjected to a direct reduction by treatment with hydrogen at an elevated temperature to again form metallic iron and hydrogen chloride or to an oxidation process by treatment with an oxygen-containing gas at an elevated temperature to form ferric oxide.

It is also contemplated within the scope of this invention that the process may be effected by utilizing a continuous method of operation. When utilizing the continuous method of operation the ore, which has been crushed or ground in a crushing zone to the desired particle size, is continuously fed to an oxidation zone wherein the ore is contacted with the oxygen-containing gas at an elevated temperature. After passage through the oxidation zone the ore is continuously fed to a reducing zone wherein the ore is subjected to a reductive roast utilizing a reductant usually comprising either hydrogen, carbon monoxide, or a combination thereof. The reductant is also continuously charged to this zone at a rate which is sufficient to maintain the amount of reductant present in the zone in a range of from about two to about three times the amount which is stoichiometrically required to reduce the iron oxides to metallic iron. After passage through the zone for a predetermined period of time the reduced ore is continuously withdrawn and passed to a leaching zone wherein it is subjected to a leach treatment with a hydrogen halide such as an aqueous hydrogens chloride solution. After passage through the leaching zone the pregnant leach liquor containing dissolved metal chlorides along with undissolved solids such as gangue or insoluble metal compounds is continuously withdrawn and passed to a filtration zone or separation zone wherein the soluble metal halides are separated from the solids. After passage through the filtration zone the pregnant leach liquor is continuously passed to a precipitation zone wherein the leach liquor is contacted with ferric oxide to effect a precipitation of titanium dioxide. The mixture of solid titanium dioxide and leach liquor containing soluble ferrous chloride is continuously withdrawn after passage through the zone to a solid/liquid separation zone wherein the solid titanium dioxide is separated and continuously withdrawn from the leach liquor and passed to storage.

The leach liquor is also continuously withdrawn from the separation zone and passed to a crystallization zone which is maintained at a lower temperature than that of the previous zones. In the crystallization zone the ferrous chloride crystallizes out of the leach liquor which is continuously withdrawn and recycled to the leach zone. The solid ferrous chloride in crystalline form is continuously withdrawn from this zone and may, if so desired, be passed to a reduction zone wherein it undergoes the direct reduction in the presence of hydrogen to form metallic iron. Metallic iron which is formed in the reduction zone is continuously withdrawn and passed to storage while the hydrogen chloride which is formed during the reduction is also continuously withdrawn and recycled to the leaching zone to form a portion of the leach solution. In the alternative, if so desired, the ferrous chloride which has been withdrawn from the crystallization zone may be passed to an oxidation zone wherein it is contacted with an oxygen-containing gas at an elevated temperature to form a mixture of iron oxides, namely, ferric oxide. These compounds are continuously withdrawn from the oxidation zone and passed to the precipitation zone hereinbefore set forth for contact with the pregnant leach liquor to effect the formation of solid titanium dioxide. Any hydrogen chloride which is formed during the reaction in the oxidation zone is also continuously withdrawn and passed to the crystallization zone wherein it is used to saturate the zone to reduce the solubility of the ferrous chloride contained therein.

In the event that an alternative method of effecting the entire process of this invention is desired, the leach liquor which contains dissolved metal chlorides, after separation from undissolved solids such as gangue, etc., is continuously withdrawn from the separation zone and passed to a crystallization zone which is maintained at a temperature lower than that of the leach zone. In the crystallization zone the ferrous chloride crystallizes out of the leach liquor, the latter then being continuously withdrawn while the solid ferrous chloride is treated in a manner similar to that hereinbefore set forth, that is, either by direct reduction to metallic iron or an oxidation to ferric oxide. The leach liquor which is continuously withdrawn from the crystallization zone is then passed to a precipitation zone wherein it is contacted with ferric oxide which is also continuously charged to the precipitation zone. After formation of solid titanium dioxide in this precipitation zone, the desired product is separated from the liquor and passed to storage.

The following examples are given for purposes of illustrating the process of this invention. However, it is to be understood that the examples are given merely for purposes of illustration and that the present process is not necessarily limited thereto.

EXAMPLE I

To illustrate the requirement that the amount of reductant which is used in the reductive roast step of the process be within a range of the type hereinbefore set forth, an ilmenite ore from Telemark, Norway was crushed to about $-35$ mesh. Samples of the crushed ore were placed in a quartz furnace tube and subjected to an oxidation treatment by passing a stream of moist air over the ore for periods of 30 to 60 minutes while maintaining temperatures of from 650° C. to 900° C. At the end of this time period the furnace tube was purged with nitrogen to flush out the moist air and thereafter the ore was subjected to a reductive roast by passing various amounts of carbon monoxide and hydrogen over the ore at temperatures of 650° to 900° C. The reductive roast was effected during periods of 0.5 to 2 hours at the end of which time the ore was allowed to cool to room temperature under a nitrogen flow.

The reduced ore was then leached by mixing 50 grams of the ore with 300 ml of hydrochloric acid in a flask and heating the mixture to 100° C. At the end of the 15 minute period the leach liquor was separated from the solids by filtration and allowed to cool to room temperature. The leach liquor was analyzed to determine the amount of titanium which had been extracted from the ilmenite ore. Analysis disclosed that in a series of runs in which 1.5 times the amount of reductant which was stoichiometrically required to reduce the iron oxides present in the ore to metallic iron resulted in an average of 58% of the titanium present being extracted in the leach liquor. A second series of experiments in which the amount is carbon monoxide and hydrogen which was passed over the ore amounted to 4.5 times the amount stoichiometrically required to reduce the iron resulted in a 47% extraction of the titanium. In contradistinction to this, when the amount of carbon monoxide and hydrogen which was passed over the ore during the reductive roast amounted to three times the amount stoichiometrically required to reduce the iron oxides to metallic iron a 75% extraction of the titanium was obtained.

EXAMPLE II

In this example 70 grams of an ilmenite ore which was ground to $-65$ mesh was subjected to an oxidation treatment by passage of air over the ore at a temperature of 900° C. Following the oxidation treatment the quartz tube in which the ore was positioned was purged with nitrogen and reduced by passage of hydrogen over the ore at a temperature of 700° C. Both the oxidation and reduction steps were performed during a period of 60 minutes. At the end of the 60 minute period the ore was allowed to cool to room temperature while maintaining a flow of nitrogen over said ore. The ore was recovered and 50 grams leached by treatment with 300 ml of hydrogen chloride for a period of 15 minutes while maintaining the temperature of the leach solution at 100° C. The solids were then separated from the pregnant leach liquor by filtration. When the amount of hydrogen which was passed over the ore amounted to twice the amount necessary to stoichiometrically reduce the iron oxides to metallic iron there was obtained a 44% extraction of the titanium. In contradistinction to this when five times the amount of hydrogen stoichiometrically required to reduce the iron oxides to iron was passed over the ore only 24% of the titanium was extracted.

It is therefore readily apparent from the above examples that when the amount of reducing agent or reductant which is passed over the ore during the reductive roast is in a range of from about two to about three times the amount stoichiometrically required to reduce the iron oxides to metallic iron it is possible to obtain a greater extraction of the titanium which is present in the pregnant leach liquor as titanium trichloride with a concomitant minimal loss of titanium which remains in the solid portion of the leach mixture as titanium dioxide.

I claim as my invention:
1. In a process for the recovery of titanium metal values from a titanium and iron bearing source which comprises the steps of:
 (a) crushing said source;
 (b) subjecting said crushed source to an oxidation treatment with an oxidizing agent at an elevated temperature;
 (c) subjecting said crushed source to a reductive roast in the presence of a reductant at an elevated temperature;
 (d) leaching the resultant reduced source with a leach solution comprising hydrogen chloride;
 (e) separating insoluble gangue from the soluble metal chlorides;
 (f) precipitating titanium dioxide from the soluble metal chlorides by treatment with iron oxides; and
 (g) separating and recovering said titanium dioxide, the improvement which comprises using as said reductant in said reductive roast step (c) a mixture of about 50% carbon monoxide and 50% hydrogen in an amount of from about two to three times the amount which is stoichiometrically required to reduce the iron oxide present in said source to metallic iron and the following recovery of titanium dioxide in step (g) reducing the temperature of the solution remaining to crystallize ferrous chloride, recovering the solid ferrous chloride, reducing a major portion of said ferrous chloride to form metallic iron and hydrogen chloride, recovering the iron and recycling the hydrogen chloride to leach step (d) as a portion of the leach solution, oxidizing the other portion of said ferrous chloride to form iron oxides and recycling said oxides to step (f).

2. The process as set forth in claim 1 in which the oxidation treatment is effected at a temperature in the range of from about 700° to about 900° C.

3. The process as set forth in claim 1 in which the reductive roast is effected at a temperature in the range of from about 600° to about 900° C.

4. The process as set forth in claim 1 in which said oxidizing agent is air.

5. The process as set forth in claim 1 in which said oxidizing agent is oxygen.

* * * * *